US012704970B2

(12) United States Patent
Lien et al.

(10) Patent No.: US 12,704,970 B2
(45) Date of Patent: Aug. 11, 2026

(54) MANAGING ALLOCATION OF SUB-BLOCKS IN A MEMORY SUB-SYSTEM

(71) Applicant: Micron Technology, Inc., Boise, ID (US)

(72) Inventors: Yu-Chung Lien, San Jose, CA (US); Tomer Tzvi Eliash, Sunnyvale, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/402,306

(22) Filed: Jan. 2, 2024

(65) Prior Publication Data

US 2024/0231641 A1 Jul. 11, 2024

Related U.S. Application Data

(60) Provisional application No. 63/437,520, filed on Jan. 6, 2023.

(51) Int. Cl.
*G06F 3/06* (2006.01)
*G06F 12/1009* (2016.01)

(52) U.S. Cl.
CPC ............ *G06F 3/0619* (2013.01); *G06F 3/064* (2013.01); *G06F 3/0679* (2013.01); *G06F 12/1009* (2013.01)

(58) Field of Classification Search
CPC ...... G06F 3/0619; G06F 3/064; G06F 3/0679; G06F 12/1009; G06F 2212/1032
See application file for complete search history.

(56) References Cited

U.S. PATENT DOCUMENTS

2015/0213893 A1* 7/2015 Parker ................ G06F 12/0207 365/185.18
2016/0147582 A1 5/2016 Karakulak et al.
2020/0159424 A1* 5/2020 Shah .................. G06F 12/0207
2021/0389879 A1 12/2021 Inbar et al.
2023/0044991 A1* 2/2023 Rajwade .............. G06F 3/0679

* cited by examiner

*Primary Examiner* — Eric Cardwell
(74) *Attorney, Agent, or Firm* — Lowenstein Sandler LLP

(57) ABSTRACT

A processing device, operatively coupled with a memory device, performs a first programming operation on a first set of cells associated with a first sub-block of a first die of the memory device, wherein each die of the memory device comprises a plurality of sub-blocks. The processing device identifies, based on a first predefined value, a second sub-block of a second die of the memory device on which to perform a second programming operation, wherein the first predefined value is a shift in an index value of the first sub-block of the first die of the memory device. The processing device further performs the second programming operation on a second set of cells associated with the second sub-block of the second die, wherein the second sub-block of the second die is associated with a different index value than the first sub-block of the first die.

22 Claims, 5 Drawing Sheets

MANAGING ALLOCATION OF SUB-BLOCKS IN A MEMORY SUB-SYSTEM

RELATED APPLICATIONS

This application claims the priority and benefit of U.S. Provisional Application No. 63/437,520, filed on Jan. 6, 2023, the entire content of which is incorporated by reference herein.

TECHNICAL FIELD

Embodiments of the disclosure relate generally to memory sub-systems, and more specifically, relate to managing allocation of sub-blocks in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
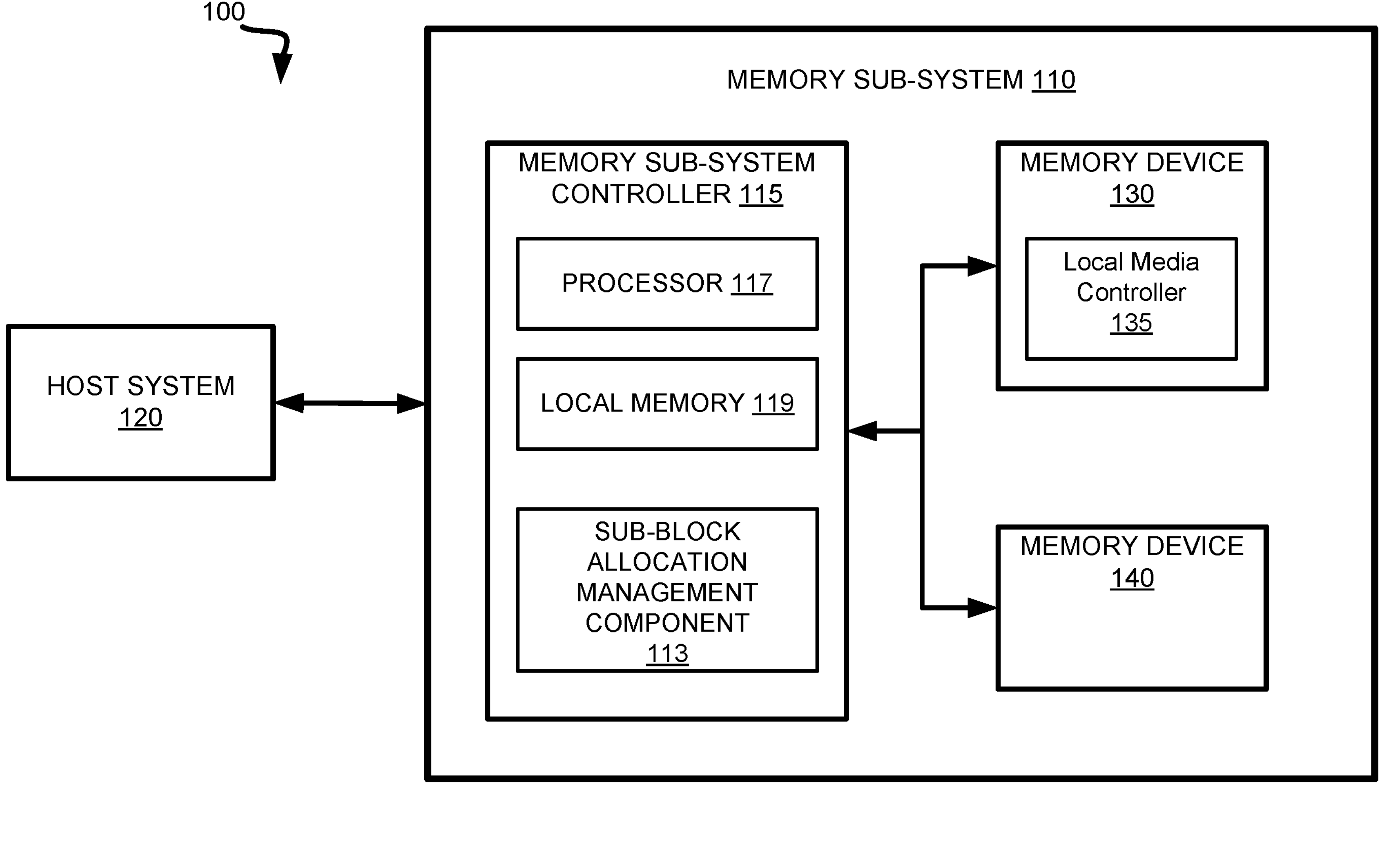
FIG. 1 illustrates an example computing system that includes a memory sub-system, in accordance with some embodiments of the present disclosure.

Aspects of the present disclosure are directed to managing allocation of sub-blocks in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die includes one or more planes. For some types of non-volatile memory devices (e.g., NAND devices), each plane includes a set of physical blocks. Each block includes a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or three-dimensional grid. Memory cells are formed onto a silicon wafer in an array of columns and rows. A memory device can further include conductive lines connected to respective ones of the memory cells, referred to as wordlines and bitlines. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. Each block can also be split into one or more sub-blocks along a given wordline. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

A memory cell ("cell") can be programmed (written to) by applying a certain voltage to the cell, which results in an electric charge being held by the cell. For example, a voltage signal $V_{CG}$ that can be applied to a control electrode of the cell to open the cell to the flow of electric current across the cell, between a source electrode and a drain electrode. More specifically, for each individual cell (having a charge Q stored thereon) there can be a threshold control gate voltage $V_T$ (also referred to as the "threshold voltage") such that the source-drain electric current is low for the control gate voltage ($V_{CG}$) being below the threshold voltage, $V_{CG}<V_T$. The current increases substantially once the control gate voltage has exceeded the threshold voltage, $V_{CG}>V_T$. Because the actual geometry of the electrodes and gates varies from cell to cell, the threshold voltages can be different even for cells implemented on the same die. The cells can, therefore, be characterized by a distribution P of the threshold voltages, $P(Q,V_T)=dW/dV_T$, where dW represents the probability that any given cell has its threshold voltage within the interval $[V_T, V_T+dV_T]$ when charge Q is placed on the cell.

A memory device can exhibit threshold voltage distributions $P(Q,V_T)$ that are narrow compared with the working range of control voltages tolerated by the cells of the device. Accordingly, multiple non-overlapping distributions $P(Q_k, V_T)$ ("valleys") can be fit into the working range allowing for storage and reliable detection of multiple values of the charge $Q_k$, k=1, 2, 3 . . . . The distributions (valleys) are interspersed with voltage intervals ("valley margins") where none (or very few) of the cells of the device have their threshold voltages. Such valley margins can, therefore, be used to separate various charge states $Q_k$. The logical state of the cell can be determined by detecting, during a read operation, between which two valley margins the respective threshold voltage $V_T$ of the cell resides. Specifically, the read operation can be performed by comparing the measured threshold voltage $V_T$ exhibited by the memory cell to one or more reference voltage levels corresponding to known valley margins (e.g., centers of the margins) of the memory device.

One type of cell is a single level cell (SLC), which stores 1 bit per cell and defines 2 logical states ("states") ("1" or "L0" and "0" or "L1") each corresponding to a respective $V_T$ level. For example, the "1" state can be an erased state and the "0" state can be a programmed state (L1). Another type of cell is a multi-level cell (MLC), which stores 2 bits per cell and defines 4 states ("11" or "L0", "10" or "L1", "01" or "L2" and "00" or "L3") each corresponding to a respective $V_T$ level. For example, the "11" state can be an erased state and the "01", "10" and "00" states can each be a respective programmed state. Another type of cell is a triple level cell (TLC), which stores 3 bits per cell and defines 8 states ("111" or "L0", "110" or "L1", "101" or "L2", "100" or "L3", "011" or "L4", "010" or "L5", "001" or "L6", and "000" or "L7") each corresponding to a respective $V_T$ level. For example, the "111" state can be an erased state and each of the other states can be a respective programmed state. Another type of a cell is a quad-level cell (QLC), which stores 4 bits per cell and defines 16 states L0-L15, where L0 corresponds to "1111" and L15 corresponds to "0000". Another type of cell is a penta-level cell (PLC), which stores 5 bits per cell and defines 32 states. Other types of cells are also contemplated. Thus, an n-level cell can use $2^n$ levels of charge to store n bits. A memory device can include one or more arrays of memory cells such as SLCs, MLCs, TLCs, QLCs, PLCs, etc. or any combination of such. For example, a memory device can include an SLC portion, and an MLC portion, a TLC portion, a QLC portion, or a PLC portion of cells.

A valley margin can also be referred to as a read window. For example, in a SLC cell, there is 1 read window that exists with respect to the 2 $V_t$ distributions. As another example, in an MLC cell, there are 3 read windows that exist with respect to the 4 $V_t$ distributions. As yet another example, in a TLC cell, there are 7 read windows that exist with respect to the 8 $V_t$ distributions. Read window size generally decreases as the number of states increases. For example, the 1 read window for the SLC cell may be larger than each of the 3 read windows for the MLC cell, and each of the 3 read windows for the MLC cell may be larger than each of the 7 read windows for the TLC cell, etc. Read window budget (RWB) refers to the cumulative value of the read windows. RWB degradation can negatively affect memory device reliability. For example, RWB degradation can lead to an increase in the number of errors (e.g., bit errors) and/or error rate (e.g., bit error rate (BER)).

Certain memory cells of certain wordlines can inherently have differing read window budgets (RWBs) from other memory cells of other wordlines and thus differing memory device reliability than other memory cells of other wordlines. The difference in RWB from wordline to wordline, and cell to cell, can be caused by variability in manufacturing processes, e.g., etching processes, etc. In certain memory devices, a cross temperature effect on memory devices can also have a significant impact on memory device reliability among wordlines. The cross-temperature effect can occur at extreme temperatures of the memory device, such as at temperatures above 60 degrees Celsius and temperatures below 10 degrees Celsius. Further, certain memory devices can scale in the z direction, e.g., by increasing the number of tiers (also referred to as layers and/or wordlines) of the memory device, and/or in the x-y direction, e.g., by increasing the number of columns (also referred to as bitlines) and sub-blocks of the memory device. Scaling can be done in order to achieve certain design scaling of the memory device according to customer requirements, cost effectiveness requirements, etc. However, scaling in either the z direction or the x-y direction can affect the reliability of the memory device. For example, scaling in the z direction can lead to variations in effectiveness of etching processes due to having to drill holes into the deep layers. However, scaling in the x-y direction can also lead to variations in effectiveness of etching processes causing insulating materials to become thinner, thus resulting in various issues such as read disturb, degraded wear cycling, and/or erase saturation, etc. In particular, in certain memory devices, certain sub-blocks can be affected greater than other sub-blocks, such that certain sub-blocks have greater degradation in reliability than other sub-blocks. For example, the inner-most sub-blocks along a wordline can be affected greater than the outer-most sub-blocks along the wordline, as described in more details below. Such issues can negatively affect system quality of service (QoS), reliability, and/or performance of the memory device.

In certain memory devices, data degradation can be measured in terms of a number of errors (e.g., bit errors and/or error count) and/or error rate (e.g., using a raw bit error rate (RBER)). When performing programming operations on memory cells of sub-blocks along wordlines with high RBERs (e.g., the RBER is greater than or equal to an RBER threshold criterion), there can be an increase in latency (and decrease in system performance) due to an additional step of performing an ECC decoding operation to correct errors in the data stored in the memory cells. In contrast, if the RBER is low (e.g., the RBER is lower than the RBER threshold criterion), no additional ECC decoding operation is performed, avoiding a decrease in system performance.

Programming operations can be performed by the memory sub-system. The programming operations can be host-initiated operations. For example, the host system can initiate a programming operation (e.g., write, read, erase, etc.) on a memory sub-system. The host system can send access requests (e.g., write commands, read commands) to the memory sub-system, such as to store data on a memory device of the memory sub-system or to read data from the memory device of the memory sub-system. The data to be read or written, as specified by a host request, is hereinafter referred to as "host data." A host request can include a logical address (e.g., a logical block address (LBA) and namespace) for the host data, which is an identifier that the host system associates with the host data. The logical address information (e.g., LBA, namespace) can be part of metadata for the host data. Metadata can also include error handling data (e.g., ECC codeword, parity code), a data version (e.g., used to distinguish age of data written), a valid bitmap (specifying which LBAs contain valid data), etc. In order to isolate from the host system various aspects of physical implementations of memory devices employed by memory sub-system, the memory sub-system controller can maintain a data structure that maps each LBA to a corresponding physical address (PA). For example, for flash memory, the physical address can include the channel identifier, die identifier, page identifier, plane identifier and/or frame identifier. The mapping data structure is referred to herein as a logical-to-physical (L2P) table. The L2P table can be segmented into multiple sections. Each section can have a number of regions, and each region can include a number of mapping entries. The L2P table is maintained by the firmware of the memory sub-system controller and is stored on one or more non-volatile memory devices of the memory sub-system.

In certain memory devices, in order to simplify L2P tables and reduce system overhead when performing programming operations, a memory sub-system controller can logically group similarly located blocks and/or sub-blocks across planes of multiple dice into a single virtual block, thus facilitating performance of concurrent programming operations. Similarly located blocks can be blocks at similar physical locations (e.g., along the same wordline and/or blocks with the same or similar physical addresses) in each die, as described in more detail below. The memory sub-system controller can address the virtual block using a single logical block address. For example, the memory sub-system controller can map the virtual block to a "LBA (logical block address) 1" in the L2P table. The memory sub-system controller can thus use the same logical block address of the virtual block to perform concurrent programming operations on blocks at similar physical locations (e.g., along the same wordline) across each die.

Therefore, since the logical block address of a virtual block can address blocks at similar physical locations (e.g., along the same wordline) across each die, there can be cases where the logical block address of a virtual block addresses blocks or sub-blocks along wordlines that have inherently higher RBERs as compared to other wordlines (e.g., due to degradation in reliability caused by scaling in the x-y direction, as described above). There can thus be an increased risk of a programming operation being performed on a virtual block that includes blocks or sub-blocks along wordlines with inherently higher RBERs. Performing such a programming operation can lead to degradation of read operation performance due to additional ECC decoding operations that would need to be performed for each wordline of each die due to the heightened RBERs. In certain cases, this can also lead to a host timeout, where the amount of time for performing a programming operation reaches the time limit the host system sets for performing the programming operation. Host timeouts can often lead to system failures due to having to continue performing programming operations on wordlines with high RBERs across each die, where performing each programming operation results in another host timeout.

Aspects of the present disclosure address the above and other deficiencies by allocating of sub-blocks in a memory sub-system in a manner avoiding high RBER clusterings of each die of a memory device. In some implementations, a memory sub-system controller receives a request to perform a programming operation (e.g., a write operation) on a set of memory cells of a sub-block formed by a wordline residing on a certain die (e.g., die 0) of a memory device. The memory sub-system controller can receive a request to perform a subsequent programming operation (e.g., another write operation) on another set of memory cells on another sub-block formed by a wordline residing on another die (e.g., an adjacent die, die 1, etc.) of the memory device. The memory sub-system controller can identify the sub-block of the adjacent die on which to perform the subsequent programming operation. In some embodiments, the memory sub-system controller identifies the sub-block using a value (e.g., a predefined and/or random value) that specifies an amount by which to shift a physical address at which to perform the subsequent programming operation on the adjacent die. For example, the memory sub-system controller can retrieve the predefined value from a table, e.g., a look-up table and/or a logical-to-physical (L2P) table. The predefined value is a constant value (e.g., integer value) assigned to each die by the memory sub-system controller during an offline testing phase of the memory device. The predefined value can be an amount of a shift to a physical address at which to perform the subsequent programming operation. For example, the predefined value can be 1, indicating that the physical address should be shifted 1 value away from the physical address at which the previous programming operation was performed on the previous die (e.g., die 0). For example, the memory sub-system controller can perform a programming operation on a set of memory cells of a sub-block 0 on die 0. The index value of the sub-block can indicate a physical address/location of the sub-block with respect to the die. The memory sub-system controller can retrieve a predefined value from a table, e.g., a predefined value of 1. The memory sub-system controller can then identify a sub-block on the adjacent die (e.g., die 1) at the same physical location (e.g., a sub-block with the same index value as the index value of sub-block 0 on die 0) (i.e., sub-block 0 on die 1). The memory sub-system controller can then apply the predefined value to the index value of sub-block 0 on die 1, shifting the index value of sub-block 0 using the predefined value of 1 (i.e., shifting from an index value of 0 to 1), such that the physical address at which the programming operation is to be performed on die 1 is shifted 1 value away from the physical address at which the programming operation was performed on die 0. In response to shifting from an index value of 0 to 1, the memory sub-system controller identifies that the sub-block on the adjacent die on which to perform the subsequent programming operation is the sub-block with an index value of 1. The memory sub-system controller can then perform the subsequent programming operation on a set of cells of sub-block (i.e., the sub-block with the index value of 1) on the adjacent die (e.g., die 1). The memory sub-system controller can continue performing any other subsequent programming operations on adjacent dice using the predefined value to shift the index value of sub-blocks.

Performing allocation of sub-blocks in a memory sub-system can result in overall improved performance of memory devices and improved data reliability. Instead of using the same sub-blocks on each die when performing programming operations, the memory sub-system can use a predefined value to shift the physical addresses (e.g., index values of the sub-blocks) where the programming operation is performed on each die, thus ensuring that different wordlines can be used when performing programming operations. Allocating sub-blocks can avoid cases where using the same sub-blocks on each die results in using only sub-blocks with high RBERs. As described above, high RBER/degradation can be seen in similar sub-blocks of all dice due to the similar physical characteristics of each die. Performing programming operations on sub-blocks with high RBER can consume more time, thus resulting in a slower system performance and/or a host timeout. Thus, allocating sub-blocks where programming operations are performed on each die can help avoid using sub-blocks with similar high RBERs among all dice. Furthermore, allocating sub-blocks can also have minimal impact on system performance because the allocation only occurs once during the lifetime of the memory device for each die. This can thus result in an increase in data reliability, an avoidance of a host system timeout, and an improvement in overall system performance.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include not-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In some embodiments, the memory sub-system 110 includes a sub-block allocation management component 113 that can be used to perform allocation of sub-blocks in a memory device 130 or memory device 140. The sub-block allocation management component 113 receives a request to perform a programming operation (e.g., perform a write operation) on a set of memory cells of a sub-block formed by a wordline residing on a certain die (e.g., die 0) of a memory device. The sub-block allocation management component 113 can receive a request to perform a subsequent programming operation (e.g., another write operation) on another set of memory cells on another sub-block formed by a wordline residing on another die (e.g., an adjacent die, die 1, etc.) of the memory device. The sub-block allocation management component 113 can identify the sub-block of the adjacent die on which to perform the subsequent programming operation. In some embodiments, the sub-block allocation management component 113 identifies the sub-block using a value (e.g., a predefined and/or random value) that specifies an amount by which to shift a physical address at which to perform the subsequent programming operation on the adjacent die. For example, the sub-block allocation management component 113 can retrieve the predefined value from a table, e.g., a look-up table and/or a logical-to-physical (L2P) table. The predefined value is a constant value (e.g., integer value) assigned to each die by the memory sub-system controller during an offline testing phase of the memory device. The predefined value can be an amount of a shift to a physical address at which to perform the subsequent programming operation. For example, the predefined value can be 1, indicating that the physical address should be shifted 1 value away from the physical address at which the previous programming operation was performed on the previous die (e.g., die 0). For example, the sub-block allocation management component 113 can perform a programming operation on a set of memory cells of a sub-block 0 on die 0. The index value of the sub-block can indicate a physical address/location of the sub-block with respect to the die. The sub-block allocation management component 113 can retrieve a predefined value from a table, e.g., a predefined value of 1. The sub-block allocation management component 113 can then identify a sub-block on the adjacent die (e.g., die 1) at the same physical location (e.g., a sub-block with the same index value as the index value of sub-block 0 on die 0) (i.e., sub-block 0 on die 1). The sub-block allocation management component 113 can then apply the predefined value to the index value of sub-block 0 on die 1, shifting the index value of sub-block 0 using the predefined value of 1 (i.e., shifting from an index value of 0 to 1), such that the physical address at which the programming operation is to be performed on die 1 is shifted 1 value away from the physical address at which the programming operation was performed on die 0. In response to shifting from an index value of 0 to 1, the sub-block allocation management component 113 identifies that the sub-block on the adjacent die on which to perform the subsequent programming operation is the sub-block with an index value of 1. The sub-block allocation management component 113 can then perform the subsequent programming operation on a set of cells of sub-block (i.e., the sub-block with the index value of 1) on the adjacent die (e.g., die 1). The sub-block allocation management component 113 can continue performing any other subsequent programming operations on adjacent dice using the predefined value to shift the index value of sub-blocks.

Further details with regards to the operations of the sub-block allocation management component 113 are described below.

Figure 2:
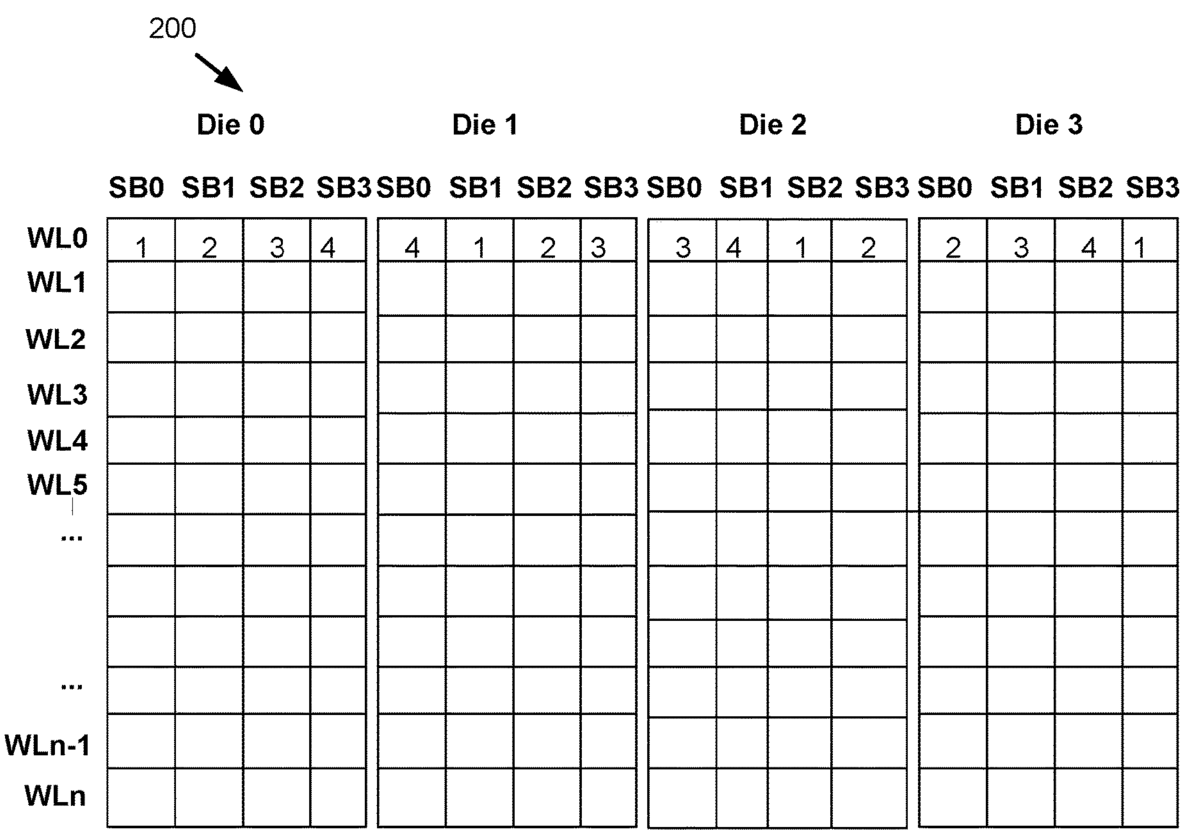
FIG. 2 is a block diagram illustrating an example set of sub-blocks across a set of dice of a memory device, in accordance with some embodiments of the present disclosure.

FIG. 2 is a block diagram illustrating an example set of sub-blocks across a set of dice of a memory device, in accordance with some embodiments of the present disclosure. As illustrated in FIG. 2, a memory device (e.g., the memory device 130 of FIG. 1) can include 4 dice, such as die 0, die 1, die 2, and die 3. Each die can have a set of wordlines that are formed across planes of the die. For example, die 0 can have a set of wordlines starting with WL0 (i.e., a wordline with an index value of 0) to WLn (i.e., a wordline with an index value of n). Die 1 can have a set of wordlines starting with WL0 (i.e., a wordline with an index value of 0) to WLn (i.e., a wordline with an index value of n). Die 2 can have a set of wordlines starting with WL0 (i.e., a wordline with an index value of 0) to WLn (i.e., a wordline with an index value of n). Die 3 can have a set of wordlines starting with WL0 (i.e., a wordline with an index value of 0) to WLn (i.e., a wordline with an index value of n). Each die can be sub-divided into one or more sub-blocks. For example, die 0 can have a set of sub-blocks such as SB0, SB1, SB2, SB3. Die 1 can have a set of sub-blocks such as SB0, SB1, SB2, SB3. Die 2 can have a set of sub-blocks such as SB0, SB1, SB2, SB3. Die 3 can have a set of sub-blocks such as SB0, SB1, SB2, SB3. In certain memory devices, there can be any number of dice that are divided into any number of sub-blocks. As illustrated in FIG. 2, a memory sub-system controller (e.g., the memory sub-system controller 115 of FIG. 1) can receive one or more requests to perform programming operations on sets of memory cells formed by wordlines residing on each die. For example, the memory sub-system controller can perform a programming operation "1" on die 0 on a set of memory cells of sub-block 0 ("SB0") (i.e., a sub-block with an index value of 0). The memory sub-system controller can receive a request to perform a subsequent programming operation on an adjacent die (e.g., die 1). To determine where on die 1 to perform the subsequent programming operation, the memory sub-system controller can retrieve a predefined and/or random value (e.g., from a look-up table and/or L2P table). In some embodiments, the predefined value is a value specifying an amount by which to shift a physical address at which to perform a programming operation. The shift in the physical address can be performed by shifting an index value of the sub-block on which the most recent programming operation was performed, where the index value identifies a physical address/location of the wordline with respect to the die. The predefined value can be assigned to each die and/or to all the dice of the memory device (e.g., during a research and development phase of the memory device based on offline testing of the memory device under various conditions to identify sub-blocks along wordlines with heightened RBERs). For example, the predefined value can be a value of 1. In response to retrieving the predefined value, the memory sub-system controller can identify a sub-block on die 1 that has an index value that is the same as the index value of the sub-block on die 0 on which the most recent programming operation was performed (e.g., SB0). The memory sub-system controller can apply the predefined value to the index value of the identified sub-block of die 1 (e.g., SB0). For example, the memory sub-system controller can shift the index value of SB0 using the predefined value (e.g., 1). Shifting the index value of SB0 using 1 can result in shifting the index value of SB0 (e.g., an index value of 0) to an index value of SB1 (e.g., an index value of 1) (i.e., 0+1=1). The memory sub-system controller can then perform the subsequent programming operation on a set of memory cells of sub-block 1 ("SB1") (e.g., the sub-block with an index value of 1) residing on die 1. For subsequent programming operations, the memory sub-system controller can repeat the shift on the index values of the sub-blocks of die 2 and 3.

In some embodiments, the memory sub-system controller can shift the index value of the sub-block using the predefined value for a subsequent programming operation, where shifting the index value results in shifting the index value of a sub-block such as SB3 (e.g., a sub-block with an index value of 3 in FIG. 2) to an index value of SB4 (e.g., a sub-block with an index value of 4) (i.e., 3+1=4). However, in certain memory sub-systems, each die can be sub-divided into a certain number of sub-blocks as described above. As illustrated in FIG. 2, the number of sub-blocks of each die can be 4 sub-blocks. Thus, shifting the index value to SB4 (e.g., a sub-block with an index value of 4) as described in the aforementioned example may not be possible because the die is not sub-divided into 5 or more sub-blocks (which would thus include a sub-block with an index value of 4). In some embodiments, the memory sub-system controller can thus perform the subsequent programming operation on a first sub-block of the die (e.g., a sub-block with an index value of 0, such as SB0 in FIG. 2). As such, the memory sub-system controller returns to an initial sub-block of the die for performing the subsequent programming operation when the memory sub-system controller reaches a final sub-block of the die. In some embodiments, the memory sub-system controller can perform programming operations concurrently across each die and or sequentially from die 0 to die 1, etc.

Figure 3:
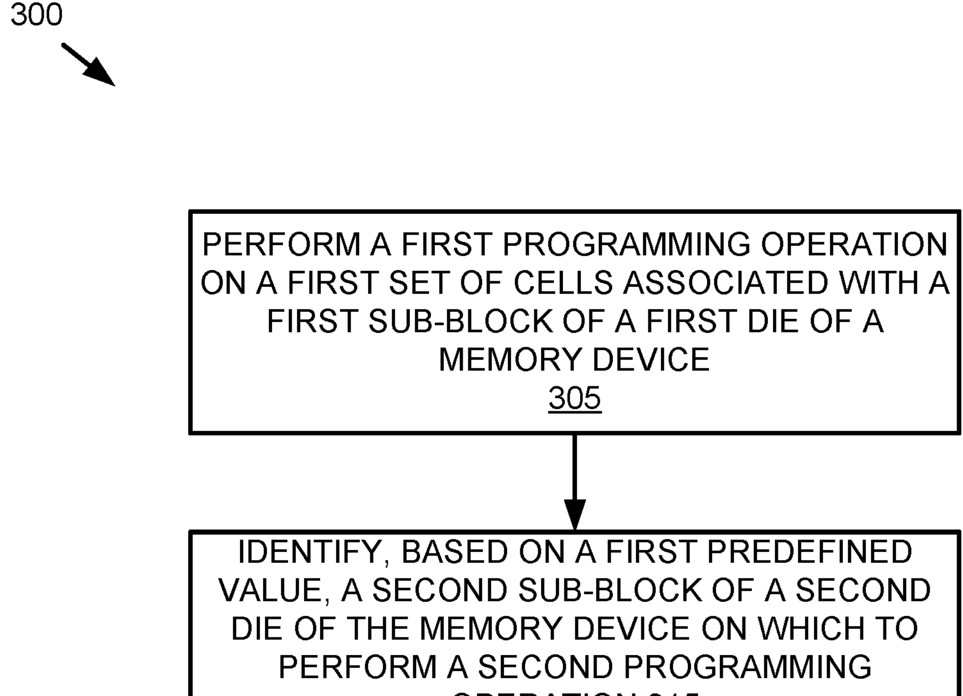
FIG. 3 is a flow diagram of an example method of performing allocation of sub-blocks in a memory sub-system, in accordance with some embodiments of the present disclosure.
Figure 4:
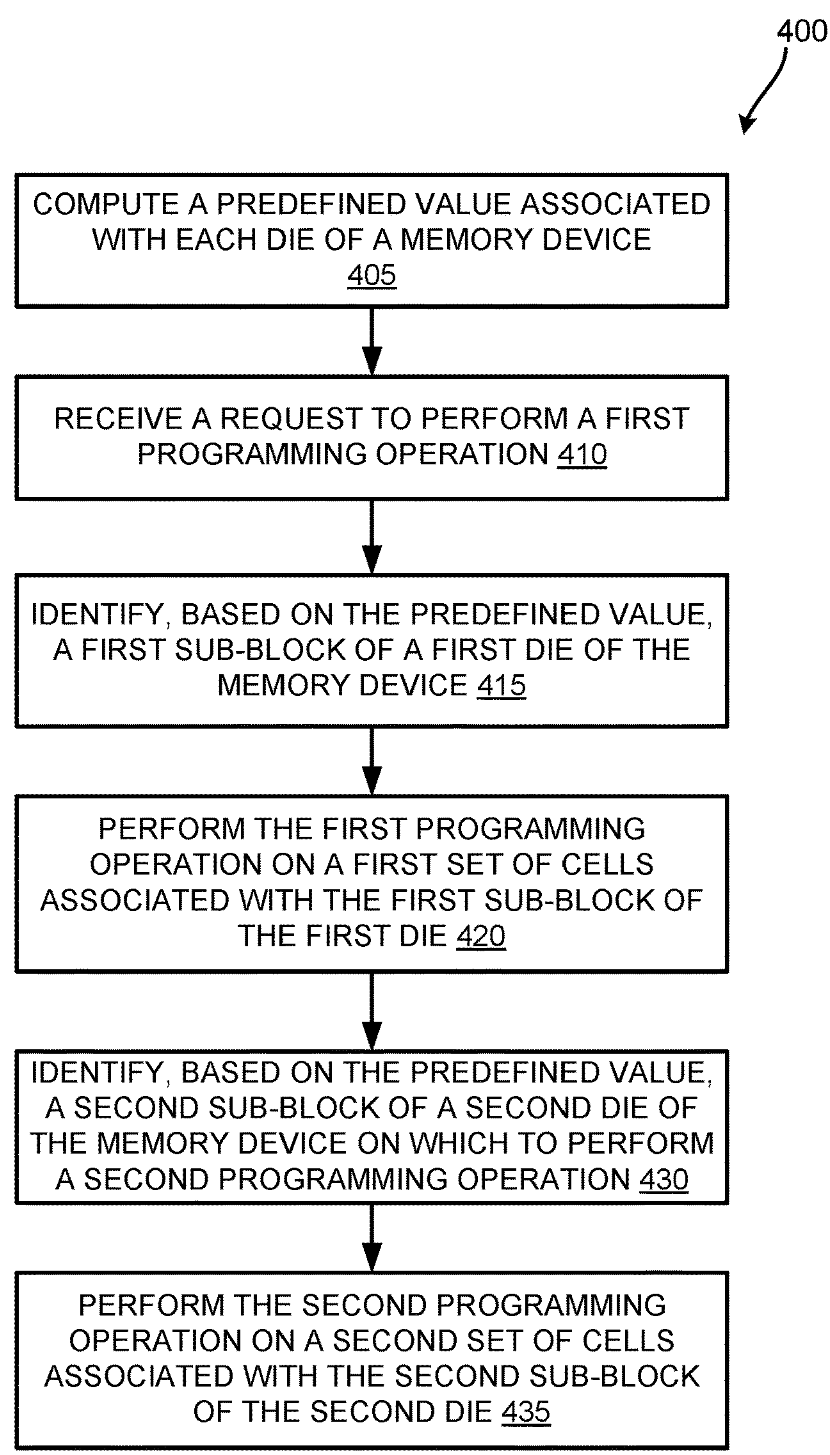
FIG. 4 is a flow diagram of an example method of performing allocation of sub-blocks in a memory sub-system, in accordance with some embodiments of the present disclosure.

Further details with respect to the allocation of sub-blocks are described with respect to FIGS. 3-4 herein.

FIG. 3 is a flow diagram of an example method of performing allocation of sub-blocks in a memory sub-system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by sub-block allocation management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing logic performs a programming operation on a set of cells of a sub-block formed by a wordline of a die of a memory device (e.g., the memory device 130 of FIG. 1). Each die of the memory device can include a set of sub-blocks. In some implementations, the programming operation is a write operation. The processing logic can receive a request to perform the programming operation from a host system (e.g., the host system 120 of FIG. 1). In some embodiments, the request to perform the programming operation can specify a logical block address that addresses a large virtual block as described herein (e.g., a group of blocks across planes of multiple dice along similarly physically located wordlines).

At operation 315, the processing logic identifies another sub-block (e.g., a second sub-block) on another die (e.g., an adjacent die) of the memory device on which to perform another (i.e., subsequent) programming operation. In some implementations, the processing logic identifies the second sub-block in response to receiving a request to perform the subsequent programming operation. In some implementations, the processing logic can identify the second sub-block on the adjacent die based on a predefined value assigned to each die of the memory device. The predefined value is a value that specifies an amount by which to shift a physical address at which to perform the subsequent programming operation on the adjacent die. For example, the processing logic can retrieve the predefined value from a data structure, such as a look-up table or a logical-to-physical (L2P) table storing data for each die and/or for the memory device. In some implementations, the predefined value can be predefined during a research and development phase of the memory device based on offline testing of the memory device under various conditions and then be stored during the research and development phase in the data structure. The predefined value can be a constant value assigned to each die of the memory device, where the predefined value takes into account sub-blocks of each die with high RBER and/or error count (e.g., sub-blocks with an RBER and/or error count that is greater than or equal to a predefined threshold RBER criterion and/or a predefined threshold error count criterion) and/or data degradation. In some implementations, retrieving the predefined value can include identifying the predefined value in an entry of the data structure. The predefined value can be a value (e.g., an integer value) that defines a shift in the physical address at which at the most recent programming operation was performed (e.g., the programming operation performed on die 0 at operation 305). In some embodiments, the shift in the physical address can be performed by shifting an index value of the sub-block on which the most recent programming operation was performed (e.g., the programming operation performed on die 0 at operation 305). In some implementations, in response to retrieving the predefined value, the processing logic can identify a sub-block on the adjacent die at the same physical location as the sub-block at which the most recent programming operation was performed (e.g., a sub-block with the same index as the index value of the sub-block on which the most recent programming operation was performed). For example, the processing logic can identify a sub-block on the adjacent die with the same index value as the index value of the sub-block on which the programming operation was performed at operation 305 herein above. For example, using FIG. 2, the processing logic can perform a programming operation on a set of memory cells of sub-block 0 ("SB0") (i.e., a wordline with an index value of 0) residing on die 0. The processing logic can retrieve a predefined value from a data structure, such a predefined value of 1. The processing logic can identify a sub-block on the adjacent die (e.g., die 1) with the index value as the index value of the sub-block on which the most recent programming operation was performed (e.g., the processing logic can identify sub-block 1 ("SB0") on die 1 as having the same index value as the index value of SB0 on die 0, where SB0 was the sub-block on which the most recent programming operation was performed), such that the sub-block identified on the adjacent die is at a similar physical location to the sub-block on die 0 at which at the most recent programming operation was performed. In some implementations, the processing logic can apply the predefined value to the index value of the identified sub-block on the adjacent die. For example, using the aforementioned example, the processing logic can apply the predefined value of 1 to the identified SB0 on die 1. In some implementations, applying the predefined value can include shifting the physical address at which the programming operation is to be performed (e.g., by shifting the index value of the identified sub-block by the predefined value). For example, the processing logic can shift the index value of SB0 (e.g., index value of 0) by a value of 1 (e.g., 0+1=1). The processing logic can thus shift the index value of SB0 (e.g., 0) to an index value of 1. In some implementations, the index value of the identified sub-block is different than the index value of the sub-block on which the most recent programming operation was performed (e.g., SB1 is a sub-block with a different index value than SB0). In some implementations, the processing logic can identify the second sub-block on the adjacent die based on a random or pseudo-random value assigned to each die of the memory device (e.g., using a random number generator, etc.).

At operation 320, the processing logic performs the subsequent programming operation on a set of cells of the sub-block at the shifted index value (e.g., the sub-block with an index value of 1 in the aforementioned example) on the adjacent die. For example, using the aforementioned example, the processing logic can perform the subsequent programming operation on SB1 (i.e., the sub-block with an index value of 1) on die 1 of the memory device.

FIG. 4 is a flow diagram of an example method of performing allocation of sub-blocks in a memory sub-system, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by sub-block allocation management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing logic computes a predefined value assigned to each die of a memory device (e.g., the memory device 130 of FIG. 1). The predefined value is a value that specifies an amount by which to shift a physical address at which to perform a programming operation on each die. In some implementations, the predefined value can be computed during a research and development phase of the memory device based on offline testing of the memory device under various conditions. The predefined value can be stored during the research and development phase in a data structure, such as a look-up table or L2P table of the memory device. The predefined value can be a constant value assigned to each die of the memory device, where the predefined value takes into account sub-blocks of each die with high RBER and/or error count (e.g., sub-blocks with an RBER and/or error count that is greater than or equal to a predefined threshold RBER criterion and/or a predefined threshold error count criterion)) and/or data degradation.

At operation 410, the processing logic receives a request to perform a programming operation. In some implementations, the processing logic receives to request from a host system (e.g., the host system 120 of FIG. 1). In some implementations, the programming operation is a write operation. In some embodiments, the request to perform the programming operation can specify a logical block address that addresses a large virtual block as described herein (e.g., a group of blocks across planes of multiple dice along similarly physically located wordlines).

At operation 415, the processing logic identifies a sub-block on a die of the memory device on which to perform the programming operation requested at operation 410. In some implementations, the processing logic can identify the sub-block on the die based on the predefined value computed at operation 405. For example, the processing logic can retrieve the predefined value from a data structure, such as a look-up table or a logical-to-physical (L2P) table storing data for each die and/or for the memory device. The predefined value can be a value (e.g., an integer value) that defines a shift in the physical address at which at the most recent programming operation was performed. In some embodiments, the shift in the physical address can be performed by shifting an index value of the sub-block on which the most recent programming operation was performed. In some implementations, in response to retrieving the predefined value, the processing logic can identify a sub-block on the adjacent die at the same physical location as the sub-block at which the most recent programming operation was performed (e.g., a sub-block with the same index as the index value of the sub-block on which the most recent programming operation was performed). For example, using FIG. 2, the processing logic can perform a programming operation on a set of memory cells of a sub-block 0 ("SB0") (i.e., a sub-block with an index value of 0) residing on die 0. The processing logic can retrieve a predefined value from a data structure, such a predefined value of 1. The processing logic can identify a sub-block on the adjacent die (e.g., die 1) with the index value as the index value of the sub-block on which the most recent programming operation was performed (e.g., the processing logic can identify SB0 on die 1 as having the same index value as the index value of SB0 on die 0, where SB0 was the sub-block on which the most recent programming operation was performed), such that the sub-block identified on the adjacent die is at a similar physical location to the sub-block on die 0 at which at the most recent programming operation was performed. In some implementations, the processing logic can apply the predefined value to the index value of the identified sub-block on the adjacent die. For example, using the aforementioned example, the processing logic can apply the predefined value of 1 to the identified SB0 on die 1. In some implementations, applying the predefined value can include shifting the physical address at which the programming operation is to be performed (e.g., by shifting the index value of the identified sub-block by the predefined value). For example, the processing logic can shift the index value of SB0 (e.g., index value of 0) by a value of 1 (e.g., 0+1=1). The processing logic can thus shift the index value of SB0 (e.g., 0) to an index value of 1. In some implementations, the index value of the identified sub-block is different than the index value of the sub-block on which the most recent programming operation was performed (e.g., SB1 is a sub-block with a different index value than SB0).

At operation 430, the processing logic identifies another sub-block (e.g., a second sub-block) on another die (e.g., an adjacent die) of the memory device on which to perform another (e.g., subsequent) programming operation. In some implementations, the processing logic identifies the second sub-block in response to receiving a request to perform the subsequent programming operation. In some implementations, the processing logic can identify the second sub-block on the adjacent die based on a predefined value assigned to each die of the memory device. For example, the processing logic can retrieve the predefined value from a data structure, such as a look-up table or a logical-to-physical (L2P) table storing data for each die and/or for the memory device. In some implementations, retrieving the predefined value can include identifying the predefined value in an entry of the data structure. The predefined value can be a value (e.g., an integer value) that defines a shift in the physical address at which at the most recent programming operation was performed (e.g., the programming operation performed on die 0 at operation 420). In some embodiments, the shift in the physical address can be performed by shifting an index value of the sub-block on which the most recent programming operation was performed (e.g., the programming operation performed on die 0 at operation 420). In some implementations, in response to retrieving the predefined value, the processing logic can identify a sub-block on the adjacent die at the same physical location as the sub-block at which the most recent programming operation was performed (e.g., a sub-block with the same index as the index value of the sub-block on which the most recent programming operation was performed). For example, the processing logic can identify a sub-block on the adjacent die with the same index value as the index value of the sub-block on which the programming operation was performed at operation 420 herein above. For example, using FIG. 2, the processing logic can perform a programming operation on a set of memory cells formed by sub-block 1 ("SB1") (i.e., a sub-block with an index value of 1) residing on die 1. The processing logic can retrieve a predefined value from a data structure, such a predefined value of 1. The processing logic can identify a sub-block on the adjacent die (e.g., die 2) with the same index value as the index value of the sub-block on which the most recent programming operation was performed (e.g., the processing logic can identify SB1 on die 2 as having the same index value as the index value of SB1 on die 1, where SB1 was the sub-block on which the most recent programming operation was performed), such that the sub-block identified on the adjacent die is at a similar physical location to the sub-block on die 1 at which at the most recent programming operation was performed. In some implementations, the processing logic can apply the predefined value to the index value of the identified sub-block on the adjacent die. For example, using the aforementioned example, the processing logic can apply the predefined value of 1 to the identified SB1 on die 2. In some implementations, applying the predefined value can include shifting the physical address at which the programming operation is to be performed (e.g., by shifting the index value of the identified sub-block by the predefined value). For example, the processing logic can shift the index value of SB1 (e.g., index value of 1) by a value of 1 (e.g., 1+1=2). The processing logic can thus shift the index value of SB1 (e.g., 1) to an index value of 2. In some implementations, the index value of the identified sub-block is different than the index value of the sub-block on which the most recent programming operation was performed (e.g., SB2 is a sub-block with a different index value than SB1).

At operation 435, the processing logic performs the subsequent programming operation on a set of cells formed by the sub-block at the shifted index value (e.g., the sub-block with an index value of 2 in the aforementioned example) on the adjacent die. For example, using the aforementioned example, the processing logic can perform the subsequent programming operation on SB2 (i.e., the wordline with an index value of 2) on die 2 of the memory device.

Figure 5:
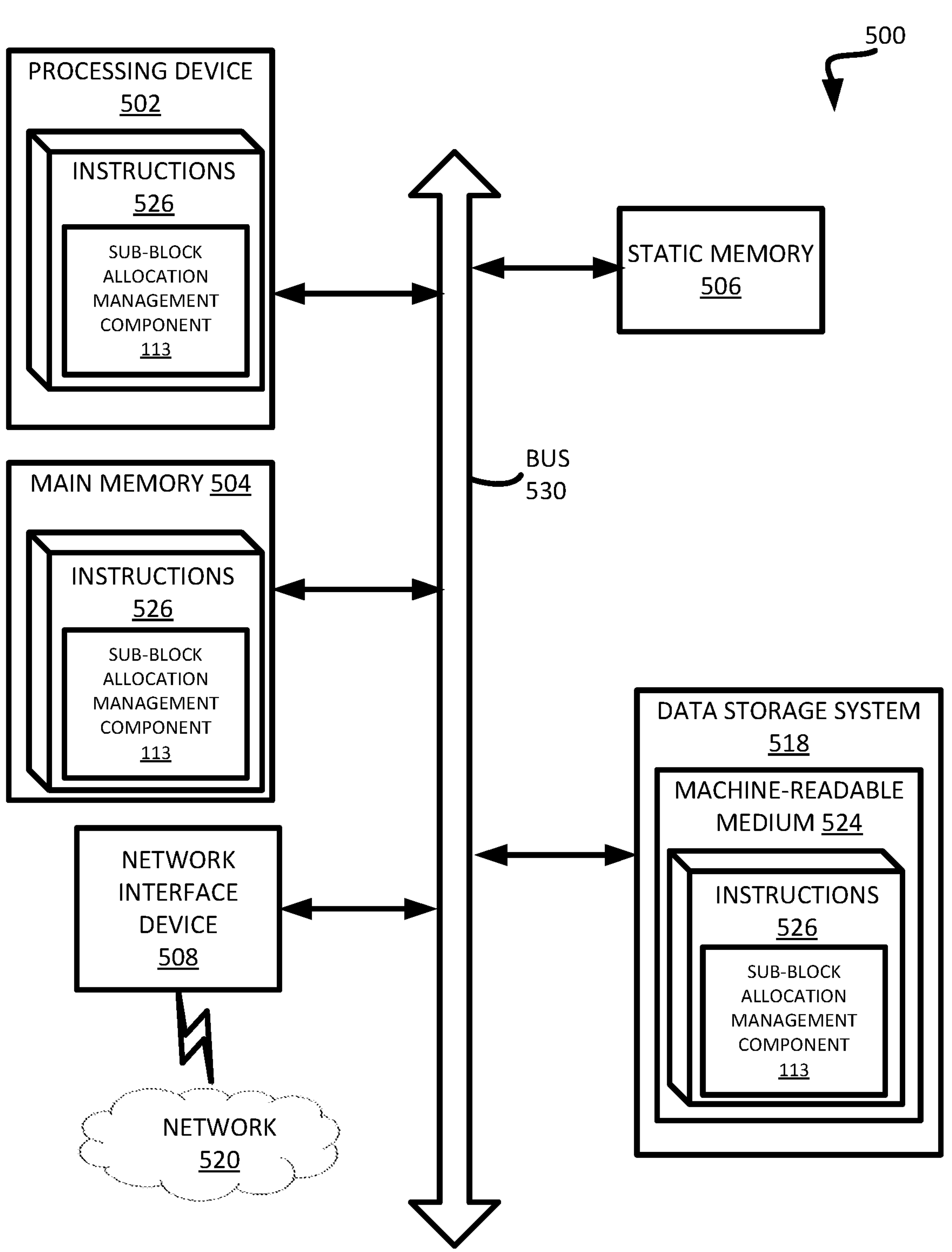
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the block allocation management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to the sub-block allocation management component 113 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a plurality of dies; and
a processing device, operatively coupled with the memory device, to perform operations comprising:
performing a first programming operation on a first set of cells associated with a first sub-block of a first die of the memory device, wherein each die of the memory device comprises a plurality of sub-blocks;
identifying, based on a first predefined value, a second sub-block of a second die of the memory device on which to perform a second programming operation, wherein the first predefined value is a shift in an index value of the first sub-block of the first die of the memory device, wherein the first predefined value is determined to avoid using sub-blocks with similar error characteristics across the plurality of dies; and
performing the second programming operation on a second set of cells associated with the second sub-block of the second die, wherein the second sub-block of the second die is associated with a different index value than the first sub-block of the first die.

2. The system of claim 1, further comprising:
receiving a request to perform a third programming operation;
identifying, based on a second predefined value, a third sub-block of a third die of the memory device, wherein the second predefined value is a shift in an index value of the second sub-block of the second die of the memory device; and
performing the third programming operation on a third set of cells associated with the third sub-block of the third die, wherein the third sub-block of the third die is associated with a different index value than the first sub-block of the first die and the second sub-block of the second die.

3. The system of claim 1, further comprising:
receiving a request to perform the first programming operation; and
receiving a request to perform the second programming operation.

4. The system of claim 1, wherein identifying, based on the first predefined value, the second sub-block of the second die of the memory device comprises:
retrieving the first predefined value from a look-up table associated with the memory device;
identifying a sub-block of the second die of the memory device, wherein the sub-block has an index value equivalent to the index value of the first sub-block of the first die;
applying the first predefined value to the index value of the identified sub-block of the second die of the memory device; and
in response to applying the first predefined value to the index value of the identified sub-block of the second die, identifying the second sub-block of the second die.

5. The system of claim 1, wherein identifying, based on the first predefined value, the second sub-block of the second die of the memory device comprises:
retrieving the first predefined value from a logical-to-physical (L2P) table associated with the memory device;
identifying a sub-block of the second die of the memory device, wherein the sub-block has an index value equivalent to the index value of the first sub-block of the first die;
applying the first predefined value to the index value of the identified sub-block of the second die of the memory device; and
in response to applying the first predefined value to the index value of the identified sub-block of the second die, identifying the second sub-block of the second die.

6. The system of claim 1, wherein the first predefined value is computed based on an error count associated with each die of the memory device.

7. The system of claim 1, wherein the first predefined value is computed using a hardware accelerator associated with the memory device.

8. The system of claim 1, further comprising:
identifying a sub-block on the second die that corresponds to a same physical location as the first sub-block on the first die; and
shifting from the identified sub-block based on the first predefined value to select the second sub-block.

9. The system of claim 1, wherein each die is a physically separate semiconductor substrate, wherein the sub-blocks are positioned at corresponding physical locations across the plurality of dies, wherein the shift is determined based on error characteristics shared by corresponding physical locations across the plurality of dies due to semiconductor manufacturing uniformity, and wherein shifting from sub-blocks with similar physical locations across the plurality of dies avoids clusters of high error rates due to manufacturing consistency across the plurality of dies.

10. A method comprising:
computing a predefined value associated with each die of a memory device comprising a plurality of dies, wherein the predefined value is a shift in an index value of each sub-block associated with each die of the memory device, wherein each die of the memory device comprises a plurality of sub-blocks, wherein the predefined value is determined to avoid using sub-blocks with similar error characteristics across the plurality of dies;
receiving a request to perform a first programming operation;
identifying, based on the predefined value, a first sub-block of a first die of the memory device;
performing the first programming operation on a first set of cells associated with the first sub-block of the first die of the memory device;
identifying, based on the predefined value, a second sub-block of a second die of the memory device on which to perform a second programming operation; and
performing the second programming operation on a second set of cells associated with the second sub-block of the second die, wherein the second sub-block of the second die is associated with a different index value than the first sub-block of the first die.

11. The method of claim 10, further comprising:

receiving a request to perform a third programming operation;

identifying, based on the predefined value, a third sub-block of a third die of the memory device; and performing the third programming operation on a third set of cells associated with the third sub-block of the third die, wherein the third sub-block of the third die is associated with a different index value than the first sub-block of the first die and the second sub-block of the second die.

12. The method of claim 10, further comprising:

receiving a request to perform the first programming operation; and receiving a request to perform the second programming operation.

13. The method of claim 10, wherein identifying, based on the predefined value, the second sub-block of the second die of the memory device comprises:

retrieving the predefined value from a look-up table associated with the memory device;

identifying a sub-block of the second die of the memory device, wherein the sub-block has an index value equivalent to the index value of the first sub-block of the first die;

applying the predefined value to the index value of the identified sub-block of the second die of the memory device; and in response to applying the predefined value to the index value of the identified sub-block of the second die, identifying the second sub-block of the second die.

14. The method of claim 10, wherein identifying, based on the predefined value, the second sub-block of the second die of the memory device comprises:

retrieving the predefined value from a logical-to-physical (L2P) table associated with the memory device;

identifying a sub-block of the second die of the memory device, wherein the sub-block has an index value equivalent to the index value of the first sub-block of the first die;

applying the predefined value to the index value of the identified sub-block of the second die of the memory device; and in response to applying the predefined value to the index value of the identified sub-block of the second die, identifying the second sub-block of the second die.

15. The method of claim 10, wherein the predefined value is computed based on an error count associated with each die of the memory device.

16. The method of claim 10, wherein the predefined value is computed using a hardware accelerator associated with the memory device.

17. A non-transitory computer-readable storage medium comprising instructions that, when executed by a processing device, cause the processing device to perform operations comprising:

performing a first programming operation on a first set of cells associated with a first sub-block of a first die of a memory device comprising a plurality of dies, wherein each die of the memory device comprises a plurality of sub-blocks;

identifying, based on a first predefined value, a second sub-block of a second die of the memory device on which to perform a second programming operation, wherein the first predefined value is a shift in an index value of the first sub-block of the first die of the memory device, wherein the first predefined value is determined to avoid using sub-blocks with similar error characteristics across the plurality of dies; and performing the second programming operation on a second set of cells associated with the second sub-block of the second die, wherein the second sub-block of the second die is associated with a different index value than the first sub-block of the first die.

18. The non-transitory computer-readable storage medium of claim 17, wherein the processing device is to perform operations further comprising:

identifying, based on a second predefined value, a third sub-block of a third die of the memory device, wherein the second predefined value is a shift in an index value of the second sub-block of the second die of the memory device; and performing a third programming operation on a third set of cells associated with the third sub-block of the third die, wherein the third sub-block of the third die is associated with a different index value than the first sub-block of the first die and the second sub-block of the second die.

19. The non-transitory computer-readable storage medium of claim 17, wherein the processing device is to perform operations further comprising:

receiving a request to perform the first programming operation; and receiving a request to perform the second programming operation.

20. The non-transitory computer-readable storage medium of claim 17, wherein to identify, based on the first predefined value, the second sub-block of the second die of the memory device, the processing device is to perform operations further comprising:

retrieving the first predefined value from a look-up table associated with the memory device;

identifying a sub-block of the second die of the memory device, wherein the sub-block has an index value equivalent to the index value of the first sub-block of the first die;

applying the first predefined value to the index value of the identified sub-block of the second die of the memory device; and in response to applying the first predefined value to the index value of the identified sub-block of the second die, identifying the second sub-block of the second die.

21. The non-transitory computer-readable storage medium of claim 17, wherein to identify, based on the first predefined value, the second sub-block of the second die of the memory device, the processing device is to perform operations further comprising:

retrieving the first predefined value from a logical-to-physical (L2P) table associated with the memory device;

identifying a sub-block of the second die of the memory device, wherein the sub-block has an index value equivalent to the index value of the first sub-block of the first die;

applying the first predefined value to the index value of the identified sub-block of the second die of the memory device; and in response to applying the first predefined value to the index value of the identified sub-block of the second die, identifying the second sub-block of the second die.

22. The non-transitory computer-readable storage medium of claim 17, wherein the first predefined value is computed using a hardware accelerator associated with the memory device.

* * * * *